(12) United States Patent
Shin

(10) Patent No.: US 7,494,099 B2
(45) Date of Patent: Feb. 24, 2009

(54) WALL MOUNT USABLE WITH DISPLAY APPARATUS

(75) Inventor: Yong-ha Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 11/221,948

(22) Filed: Sep. 9, 2005

(65) Prior Publication Data

US 2006/0065806 A1 Mar. 30, 2006

(30) Foreign Application Priority Data

Sep. 24, 2004 (KR) .................... 10-2004-0077163

(51) Int. Cl.
*E04G 3/00* (2006.01)
(52) U.S. Cl. ................. 248/276.1; 248/284.1
(58) Field of Classification Search ......... 248/917–924, 248/681–683, 284.1, 291.1, 371, 372.1, 282.1, 248/292.13, 292.14, 286.1, 287.1
See application file for complete search history.

(56) References Cited

U.S. PATENT DOCUMENTS

| | | | | |
|---|---|---|---|---|
| 5,730,409 | A * | 3/1998 | Baron et al. | 248/292.12 |
| 6,554,242 | B2 * | 4/2003 | Kim | 248/371 |
| 6,886,701 | B2 * | 5/2005 | Hong et al. | 211/99 |
| 6,889,404 | B2 * | 5/2005 | Lu et al. | 16/287 |
| 6,964,399 | B1 * | 11/2005 | O'Neill | 248/292.13 |
| 2002/0033436 | A1 * | 3/2002 | Peng et al. | 248/284.1 |
| 2003/0222041 | A1 * | 12/2003 | Hong et al. | 211/99 |
| 2005/0236542 | A1 * | 10/2005 | O'Neill | 248/286.1 |

FOREIGN PATENT DOCUMENTS

| | | |
|---|---|---|
| JP | 10-175021 | 6/1998 |
| JP | 2001-75487 | 3/2001 |
| KR | 2000-11034 | 6/2000 |
| KR | 20-0281318 | 7/2002 |
| KR | 2003-25988 | 3/2003 |
| KR | 20-329506 | 10/2003 |
| KR | 2004-68634 | 8/2004 |

OTHER PUBLICATIONS

Korean Office Action dated Apr. 20, 2006 issued in KR 2004-77163.

* cited by examiner

*Primary Examiner*—Carl D. Friedman
*Assistant Examiner*—Steven Marsh
(74) *Attorney, Agent, or Firm*—Stanzione & Kim, LLP

(57) ABSTRACT

A wall mount usable with a display apparatus to mount the display apparatus on a wall, includes a base to attach to the wall, a supporting bracket supported by the base, a rotating bracket tiltably coupled to the supporting bracket and on which the display apparatus is mounted, and an elastic member provided between the supporting bracket and the rotating bracket to expand or contract according to rotation of the rotating bracket to adjust a tilt angle of the rotating bracket. Thus, the wall mount easily tilts the display apparatus through a simplified tilting structure.

17 Claims, 5 Drawing Sheets

WALL MOUNT USABLE WITH DISPLAY APPARATUS

CROSS-REFERENCE TO RELATED APPLICATIONS

This application claims the benefit under 35 U.S.C. § 119 of Korean Patent Application No. 2004-77163, filed on Sep. 24, 2004, in the Korean Intellectual Property Office, the disclosure of which is incorporated herein in its entirety by reference.

BACKGROUND OF THE INVENTION

1. Field of the Invention

The present general inventive concept relates to a wall mount usable with a display apparatus, and more particularly, to a wall mount usable with a display apparatus having an improved tilting structure to tilt the display apparatus.

2. Description of the Related Art

A display apparatus refers to various kinds of apparatuses visually displaying data of text, images, or the like on a display panel.

Flat panel display apparatuses, such as a PDP (plasma display panel) or an LCD (liquid crystal display) are widely used as televisions or monitors, and research and development of the flat panel display apparatuses are being actively carried out. Thus, a demand for a wall mount is increasing, since the wall mount is less restricted by an installing place and occupies a small amount of space by installing the display apparatus on the wall.

In a conventional wall mount, a tilt angle of the display apparatus can be selectively adjusted through an angle adjusting member placed between a supporting bracket and a rotating bracket. The conventional wall mount having such a structure is disclosed in Korean Utility Model Application No. 20-1998-23535, Korean Patent Application No. 10-2003-5107, Korean Utility Model Application No. 20-2003-23146, Japanese Patent First Publication No. 1998-174021, etc.

However, the conventional wall mount having such a structure comprises a complicated structure of the angle adjusting member for adjusting the tilt angle of the display apparatus.

Further, the angle adjusting member of the conventional wall mount requires many components, and thus it costs a lot for the components and assembly of the conventional wall mount.

SUMMARY OF THE INVENTION

Accordingly, the present general inventive concept provides a wall mount usable with a display apparatus to easily tilt the display apparatus through a simplified tilting structure.

Additional aspects and/or advantages of the present general inventive concept will be set forth in part in the description which follows and, in part, will be obvious from the description, or may be learned by practice of the present general inventive concept.

The foregoing and/or other aspects and advantages of the present general inventive concept are achieved by providing a wall mount usable with a display apparatus to mount the display apparatus on a wall, the wall mount comprising a base to attach to the wall, a supporting bracket supported by the base, a rotating bracket tiltably coupled to the supporting bracket, and on which the display apparatus is mounted, and an elastic member provided between the supporting bracket and the rotating bracket to expand or contract according to a rotation of the rotating bracket to adjust a tilt angle of the rotating bracket.

The elastic member may comprise a shaft provided at the supporting bracket, a roller rotatably provided at the shaft, and a spring wound around the roller and coupled to the rotating bracket.

The spring may comprise a leaf spring.

The wall mount may further comprise an auxiliary shaft provided at an upper part of the supporting bracket, and an auxiliary roller rotatably provided at the auxiliary shaft to rotatably support the spring.

The foregoing and/or other aspects and advantages of the present general inventive concept are also achieved by providing a wall mount to mount a display apparatus on a wall, the wall mount comprising a base to attach to the wall, a plurality of supporting brackets attached to the base, a plurality of rotating brackets coupled to the display apparatus, each supporting bracket attached to a respective supporting bracket at one end thereof to tilt with respect to the respective supporting bracket, and a plurality of elastic members each connected at one end to a respective rotating bracket and at another end to a respective supporting bracket to support the respective rotating bracket at different tilt angles with respect to the respective supporting bracket.

The foregoing and/or other aspects and advantages of the present general inventive concept are also achieved by providing a wall mount to mount a display apparatus on a wall, the wall mount comprising a base attachable to the wall, and a tiltable bracket assembly to tiltably support the display apparatus to the base, and comprising a fixed bracket supported by the base, a tilting bracket coupled to the display apparatus at a first portion, and attached to the fixed bracket at a second portion to be tiltable with respect to the fixed bracket, and an elastic member connected between the fixed bracket and the tilting bracket to apply an elastic force the tilting bracket to support the tilting bracket at a desired tilt angle with respect to the fixed bracket.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
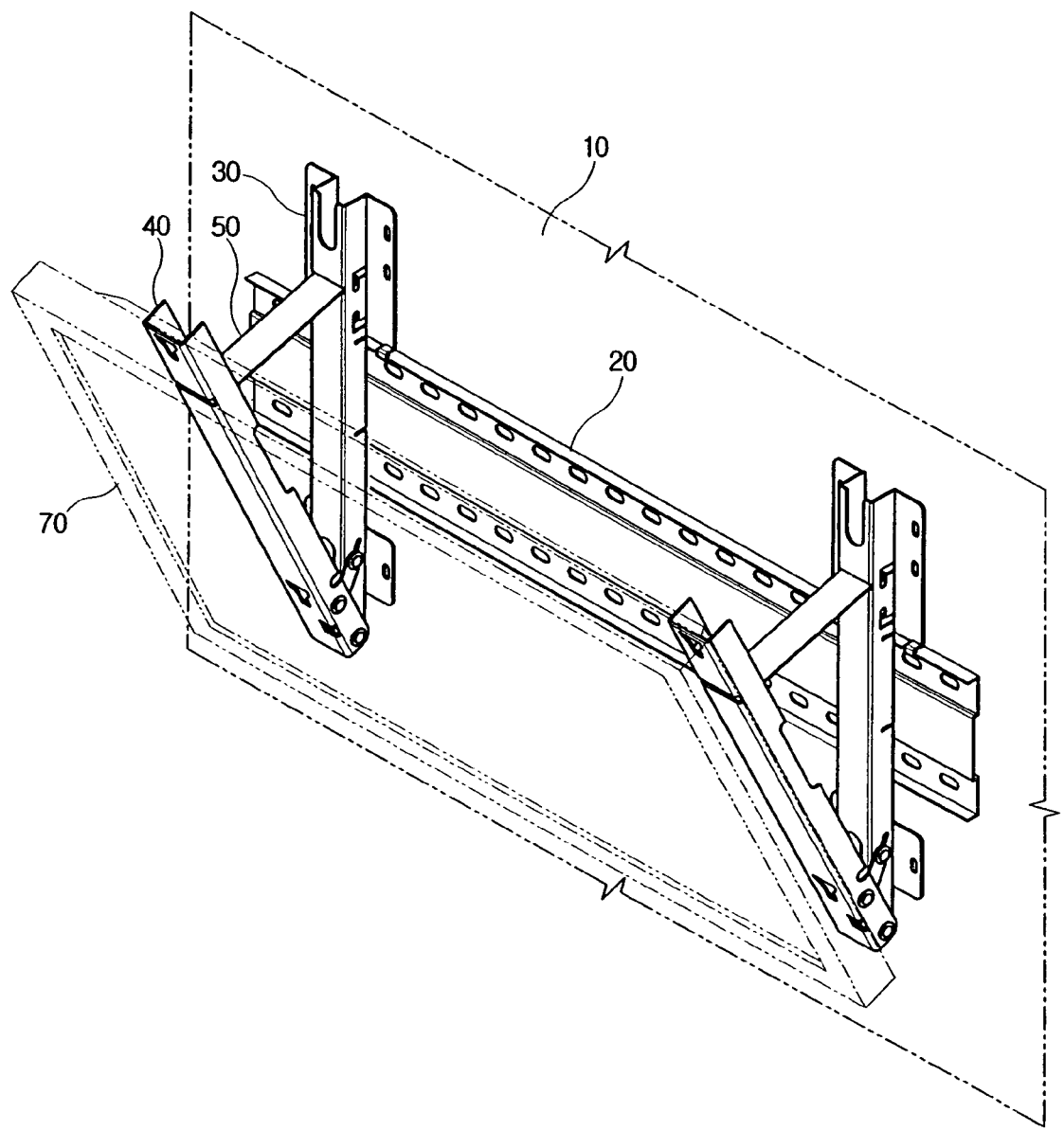
FIG. 1 is a perspective view of a wall mount usable with a display apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

Figure 2:
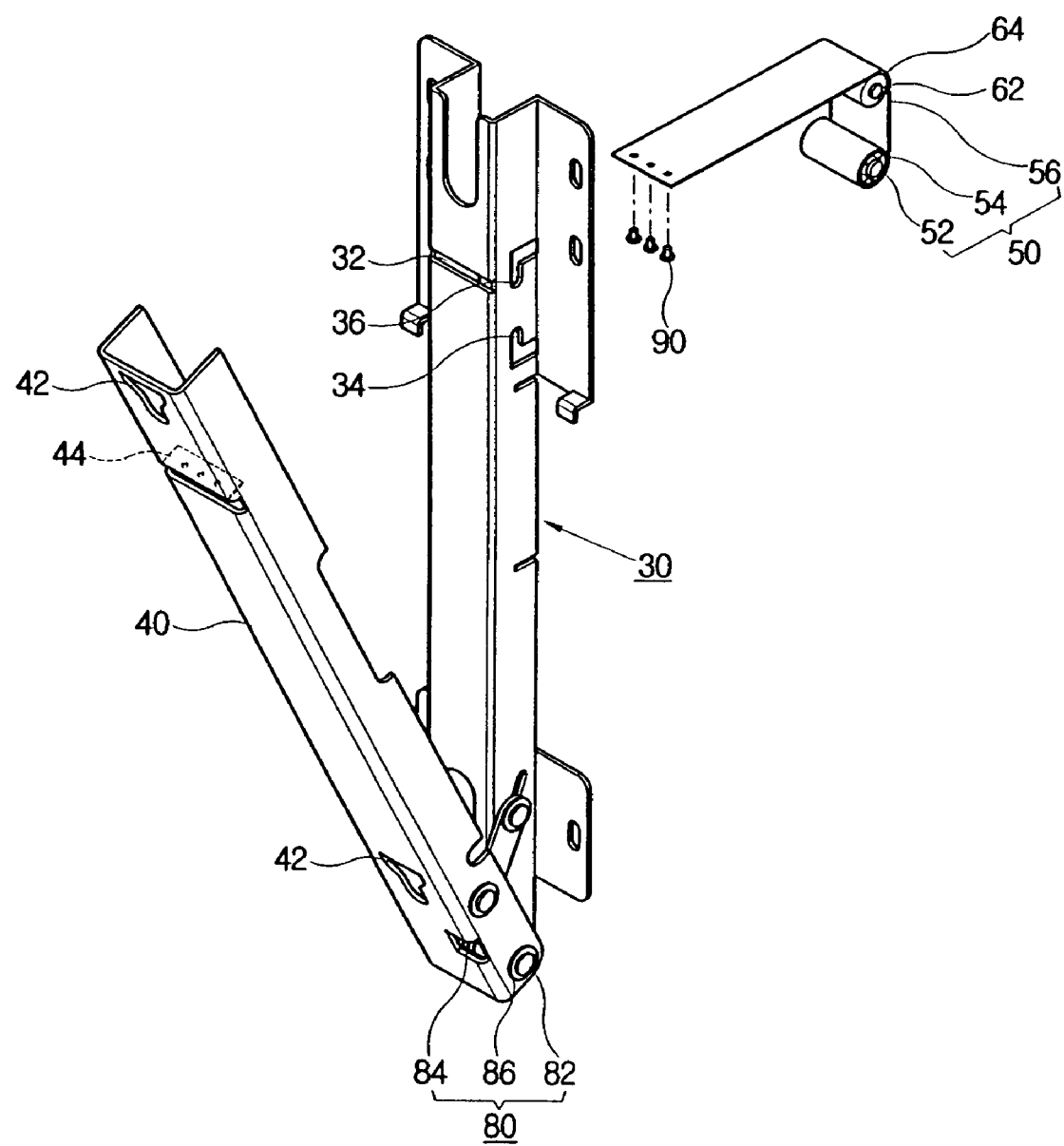
FIG. 2 is an exploded perspective view of a coupling structure of a supporting bracket and a rotating bracket of the wall mount of FIG. 1.
Figure 3:
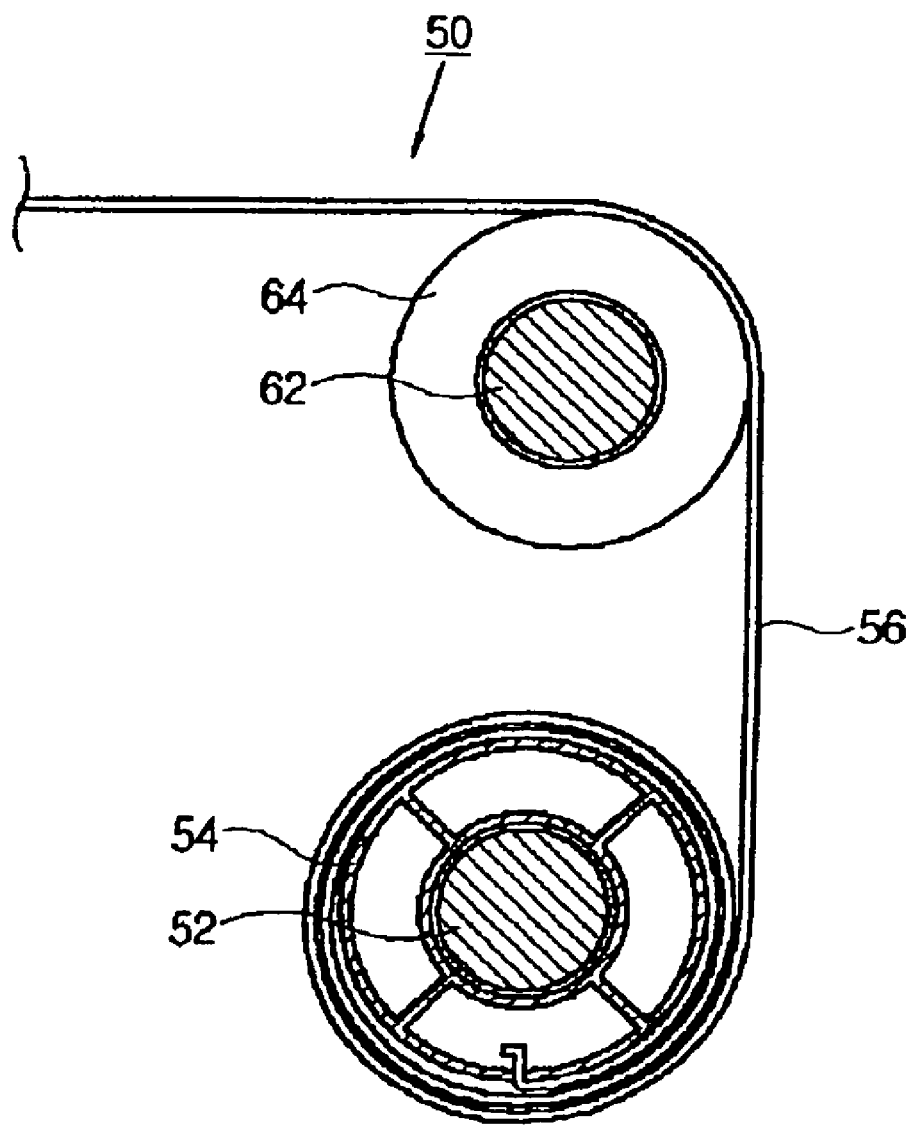
FIG. 3 is a sectional view of an elastic member of the wall mount of FIG. 1.

Referring to FIGS. 1 through 3, a wall mount usable with a display apparatus 70 according to an embodiment of the present general inventive concept comprises a base 20 attached to a wall 10, a supporting bracket 30 supported by the base 20, a rotating bracket 40 tiltably coupled to the supporting bracket 30 and mounted with the display apparatus 70, an elastic member 50 placed between the supporting bracket 30 and the rotating bracket 40 to elastically expand or contract according to a rotation of the rotating bracket 40 to adjust a tilt angle of the rotating bracket 40 with respect to the supporting bracket 30.

The base 20 is firmly attached to the wall 10 to stably support the supporting bracket 30, the rotating bracket 40 and the display apparatus 70. The structure of the base 20 is not limited to the base 20 illustrated in FIG. 1, and can be variously changed.

Two supporting brackets 30 can be placed at opposite sides of the base 20. Since the two supporting brackets 30 are the same, only one will be described herein. An upper part of the supporting bracket 30 is formed with a spring through hole 32 and a shaft supporting hole 34 to accommodate the elastic member 50. Lower parts of the supporting bracket 30 and the rotating bracket 40 are rotatably coupled to each other by a hinge member 80. The hinge member 80 can comprise a hinge shaft 82, a coil spring 84 and a washer 86.

The coil spring 84 and the washer 86 strongly support the display apparatus 70, as well as allow the rotating bracket 40 to rotate easily with respect to the supporting bracket through an elastic force of the coil spring 84 and a friction force of the washer 86.

When the tilt angle of the rotating bracket 40 is zero with respect to the supporting bracket 30, the rotating bracket 40 surroundingly couples the supporting bracket 30 to make an external shape of the wall mount slim. Also, the rotating bracket 40 is formed with a mounting part 42 to mount the display apparatus 70, and a coupling part 44 to couple with the elastic member 50.

The elastic member 50 comprises a shaft 52 provided at the supporting bracket 30, a roller 54 rotatably provided at the shaft 52, and a spring 56 wound around the roller 54 and coupled to the rotating bracket 40.

The shaft 52 is supported by the shaft supporting hole 34 of the supporting bracket 30.

The spring 56 passes through the spring through hole 32 of the supporting bracket 30, and is then coupled to the coupling part 44 of the rotating bracket 40. A leaf spring shaped like a plate can be used as the spring 56, and a tensile strength of the leaf spring can be properly adjusted by changing a material, a thickness and a width of the leaf spring, depending on a weight of the display apparatus 70. The spring 56 can be coupled to the coupling part 44 of the rotating bracket 40 by screws 90, or other coupling devices that perform the intended coupling operation.

On an upper part of the supporting bracket 30, above the shaft supporting hole 34, can be formed an auxiliary shaft supporting hole 36. An auxiliary shaft 62 and an auxiliary roller 64 rotatably coupled to the auxiliary shaft 62 are provided at the auxiliary shaft supporting hole 36. The auxiliary roller 64 supports the spring 56 of the elastic member 50 as the spring 56 rotates with the roller 54. Thus, the spring 56 can rotate smoothly.

Figure 4A:
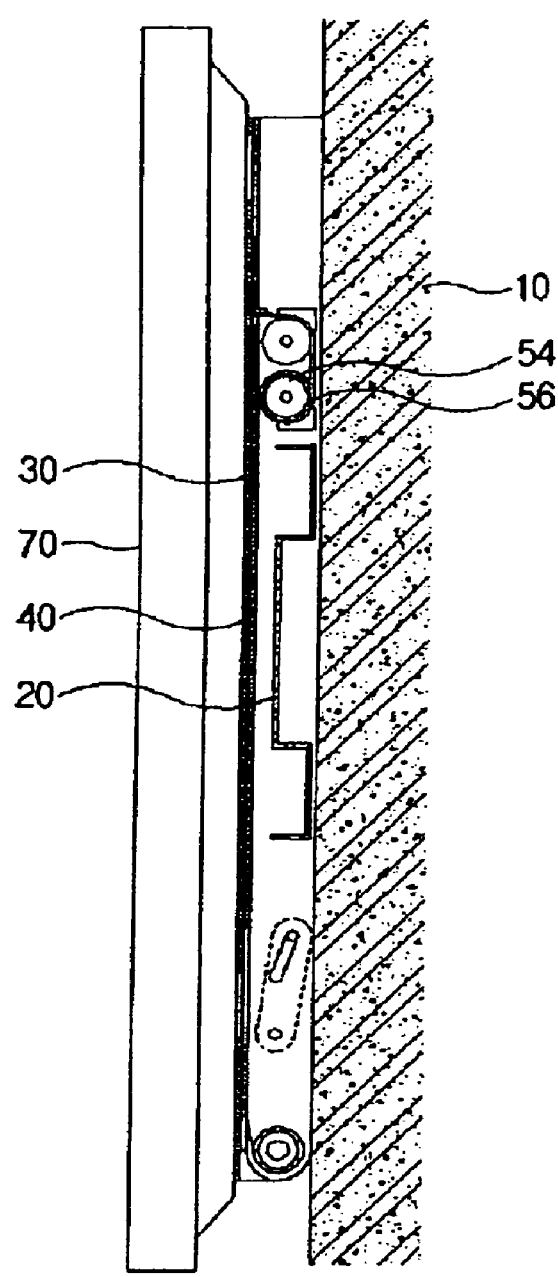
FIGS. 4A and 4B illustrate an operation of the wall mount of FIG. 1.
Figure 4B:
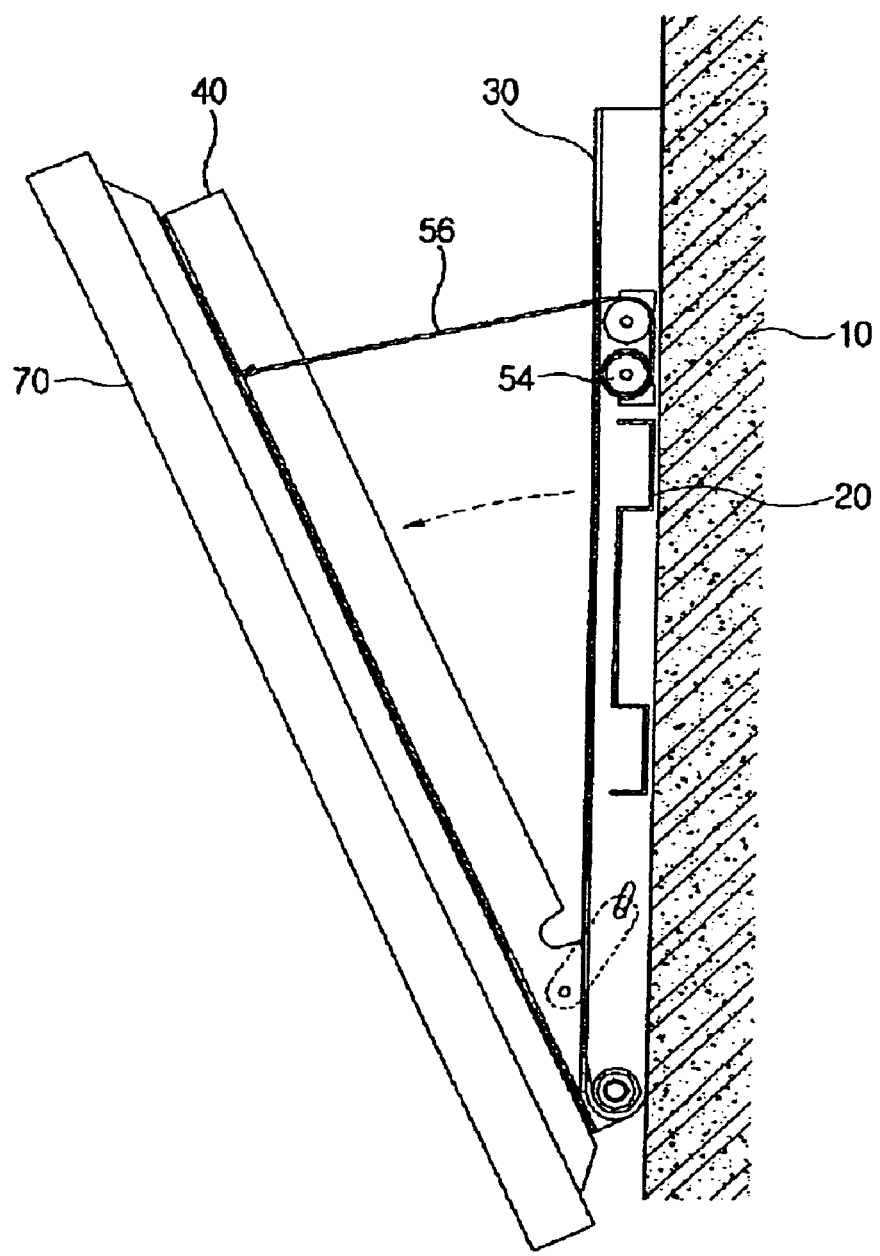

FIGS. 4A and 4B illustrate an operation of the wall mount of FIGS. 1-4.

FIG. 4A illustrates the display apparatus 70 disposed to be parallel with the wall 10 by the wall mount. That is, the rotating bracket 40 is coupled in parallel with the supporting bracket 30 mounted at the base 20, and does not form an angle of inclination with respect to the supporting bracket 30.

As illustrated in FIG. 4A, the spring 56 wound around the roller 54 contracts completely when the display apparatus 70 is parallel to the wall 10.

As illustrated in FIG. 4B, when the display apparatus 70 mounted at the rotating bracket 40 is pulled by an external force to adjust the tilt angle of the rotating bracket 40, the rotating bracket 40 rotates with respect to the supporting bracket 30, and at the same time, the spring 56 wound around the roller 54 expands elastically.

As illustrated in FIG. 4B, the rotating bracket 40 in a suspension state is secured by the weight of the display apparatus 70, the tensile strength of the spring 56 wound around the roller 54 and the friction force of the washer 86.

Also, the tilt angle between the rotating bracket 40 and the supporting bracket 30 can be decreased by moving the display apparatus 70 with an external force until the display apparatus 70 reaches a desired position. When the tilt angle between the rotating bracket 40 and the supporting bracket 30 is decreased, the spring 56 wound around the roller 54 contracts.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A wall mount usable with a display apparatus to mount the display apparatus on a wall, the wall mount comprising:
   a base to attach to the wall;
   a supporting bracket supported by the base;
   a rotating bracket tiltably coupled to the supporting bracket, and on which the display apparatus is mounted, the rotating bracket surroundingly coupling the supporting bracket when a tilt angle of the rotating bracket is zero with respect to the supporting bracket; and
   an elastic member provided between the supporting bracket and the rotating bracket to expand or contract through at least one of the supporting bracket and the rotating bracket according to a rotation of the rotating bracket to adjust the tilt angle of the rotating bracket with respect to the supporting bracket.

2. The wall mount according to claim 1, wherein the elastic member comprises a shaft provided at the supporting bracket, a roller rotatably provided at the shaft, and a spring wound around the roller and coupled to the rotating bracket.

3. The wall mount according to claim 2, wherein the spring comprises a leaf spring.

4. The wall mount according to claim 3, further comprising:
   an auxiliary shaft provided in at supporting bracket to be positioned at an upper part of the supporting bracket; and
   an auxiliary roller rotatably provided in the auxiliary shaft to rotatably support the spring.

5. The wall mount according to claim 1, further comprising:
   a hinge member to tiltably couple the rotating bracket to the supporting bracket.

6. The wall mount according to claim 1, wherein a strength of the elastic member is determined according to a weight of the display apparatus.

7. The wall mount according to claim 1, wherein when the tilt angle of the rotating bracket decreases, the elastic member contracts, and when the tilt angle of the rotating bracket increases, the elastic member expands.

8. A wall mount to mount a display apparatus on a wall, the wall mount comprising:
- a base to attach to the wall;
- a plurality of supporting brackets attached to the base;
- a plurality of rotating brackets coupled to the display apparatus, each supporting bracket attached to a respective supporting bracket at one end thereof to tilt with respect to the respective supporting bracket; and
- a plurality of elastic members each connected at one end to a respective rotating bracket and at another end to a respective supporting bracket and elastically extendable through at least one of the rotating bracket and the supporting bracket with a biasing force to support the respective rotating bracket at different tilt angles with respect to the respective supporting bracket, each of the elastic members comprising:
  - a shaft provided at an upper portion of the respective supporting bracket;
  - a roller provided at the shaft to rotate around the shaft; and
  - a spring having one end attached to the respective rotating bracket and another end attached to the roller to wind around the roller and unwind from the roller according to the tilt angle of the respective of rotating bracket.

9. The wall mount according to claim 8, wherein the spring comprises a leaf spring.

10. The wall mount according to claim 8, wherein a strength of the spring is determined according to a weight of the display apparatus.

11. The wall mount according to claim 8, wherein each of the plurality of supporting brackets is provided an auxiliary roller rotating around an auxiliary shaft to guide the spring of the respective one of the plurality of elastic members to wind around and unwind from the roller in of the respective one of the plurality of elastic members.

12. The wall mount according to claim 8, wherein when the tilt angle of the plurality of rotating brackets is zero with respect to the plurality of supporting brackets, the spring is completely wound around the roller in each of the plurality of elastic members.

13. The wall mount according to claim 8, wherein a length of the spring is determined according to a desired maximum value of the tilt angle of the plurality of rotating brackets.

14. The wall mount according to claim 8, wherein each of the plurality of rotating brackets overlaps with the respective supporting bracket when the tilt angle of the plurality of rotating brackets is zero.

15. A wall mount to mount a display apparatus on a wall, the wall mount comprising:
- a base attachable to the wall; and
- a tiltable bracket assembly to tiltably support the display apparatus to the base, and comprising:
  - a fixed bracket supported by the base,
  - a tilting bracket coupled to the display apparatus at a first portion, and attached to the fixed bracket at a second portion to be tiltable with respect to the fixed bracket, and
  - an elastic member connected between the fixed bracket and the tilting bracket to apply an elastic force the tilting bracket while extending through at least one of the tilting bracket and the fixed bracket to support the tilting bracket at a desired tilt angle with respect to the fixed bracket, the elastic member comprising:
    - a shaft provided at the fixed bracket;
    - a roller to rotate around the shaft; and
    - a spring having a wound portion wound around the roller and an unwound portion extending between the fixed bracket and the tilting bracket.

16. The wall mount according to claim 15, wherein the tiltable bracket assembly further comprises:
- an auxiliary shaft provided at the fixed bracket above the shaft; and
- an auxiliary roller to rotate around the auxiliary shaft to guide the spring to wind around or unwind from the roller.

17. The wall mount according to claim 15, wherein the elastic force of the elastic member is substantially equal to a weight of the display apparatus to hold the display apparatus at the desired apparatus at the desired tilt angle.

* * * * *